(12) United States Patent
Kamal et al.

(10) Patent No.: US 7,869,344 B1
(45) Date of Patent: Jan. 11, 2011

(54) 1+N NETWORK PROTECTION FOR MESH NETWORKS: NETWORK CODING-BASED PROTECTION USING P-CYCLES AND PROTECTION PATHS

(75) Inventors: Ahmed E. Kamal, Ames, IA (US); Aditya Ramamoorthy, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 105 days.

(21) Appl. No.: 12/323,598

(22) Filed: Nov. 26, 2008

Related U.S. Application Data

(60) Provisional application No. 60/990,183, filed on Nov. 26, 2007.

(51) Int. Cl.
*H04L 12/26* (2006.01)

(52) U.S. Cl. .................................................. 370/216

(58) Field of Classification Search ......... 370/216–228, 370/355, 389, 464; 709/223–225, 238–244
See application file for complete search history.

(56) References Cited

U.S. PATENT DOCUMENTS

| | | | | |
|---|---|---|---|---|
| 5,257,261 | A * | 10/1993 | Parruck et al. | 370/522 |
| 6,404,734 | B1 * | 6/2002 | Stamatelakis et al. | 370/227 |
| 7,308,198 | B1 * | 12/2007 | Chudak et al. | 398/58 |
| 7,398,321 | B2 * | 7/2008 | Qiao et al. | 709/239 |
| 7,609,624 | B2 * | 10/2009 | Alicherry et al. | 370/228 |
| 7,620,322 | B2 * | 11/2009 | Sparks et al. | 398/49 |
| 2005/0198524 | A1 * | 9/2005 | Benvenuti et al. | 713/200 |
| 2006/0164976 | A1 * | 7/2006 | Grover et al. | 370/228 |
| 2007/0153674 | A1 * | 7/2007 | Alicherry et al. | 370/216 |
| 2009/0046572 | A1 * | 2/2009 | Leung | 370/216 |

OTHER PUBLICATIONS

Hernandez, The Generic Framing Procedure (GFP): an Overview, IEEE Communications Magazine, May 2002, pp. 63-71.*
Grover, Wayne D., "Mesh-Based Survivable Networks: Options and Strategies for Optical, MPLS, Sonet, and ATM Networking", Upper Saddle River, NJ: Prentice-Hall 2004, pp. VII-XIX.
Stamatelakis, Demetrios, "IP Layer Restoration and Network Planning Based on Virtual Protection Cycles", IEEE Journal on Selected Areas in Communications, vol. 18, No. 10, Oct. 2000, pp. 1938-1949.
Zhou, Dongyun et al., "Survivability in Optical Networks", IEEE Network, #0890-8044, Nov./ Dec. 2000, pp. 16-23.

* cited by examiner

*Primary Examiner*—Dmitry H Levitan
(74) *Attorney, Agent, or Firm*—McKee, Voorhees & Sease, P.L.C.

(57) ABSTRACT

A method and system for providing protection of multiple communication sessions using the bandwidth resources on the order of those required to protect a single communication session. This is facilitated through the use of network coding on a protection cycle. Transmissions from all connections are coded together using network coding and transmitted in two different directions on a cycle, so that the signal can be recovered by the receiver in two ways: on the working path, and on the protection (cycle) path.

17 Claims, 7 Drawing Sheets

| data unit 1 | | data unit 2 | data unit 3 | | data unit 4 |
|---|---|---|---|---|---|
| segment 1 | | segment 2 | | segment 3 | |

*Fig. 6*

1+N NETWORK PROTECTION FOR MESH NETWORKS: NETWORK CODING-BASED PROTECTION USING P-CYCLES AND PROTECTION PATHS

CROSS-REFERENCE TO RELATED APPLICATIONS

This application claims priority under 35 U.S.C. §119(e) to provisional application Ser. No. 60/990,183 filed Nov. 26, 2007, herein incorporated by reference in its entirety.

FIELD OF THE INVENTION

The present invention relates to network protection. More specifically, the present invention relates to network protection which is fast and efficient.

BACKGROUND OF THE INVENTION

Protection techniques are either 1+1, where a single session is protected by duplicating the resources required by the session which are used to send a second copy of the signal, and hence recovery from failures is instantaneous, or 1:N, where resources for a single session are shared between N sessions, but this requires the detection of the failure, and determining which session should use the backup facilities. The first technique is fast, but requires at least 100 percent extra resources. The second technique is more efficient, but slow since the management and control planes must be involved.

What is needed is a protection method that uses less resources such as the 1:N method, but which has the speed of the 1+1 method.

SUMMARY OF THE INVENTION

The present invention provides a method to provide transparent non-stop service in communication networks. If a communication link such as, but not limited to an optical fiber, fails, communication can proceed in a transparent manner such as without the network management or control planes having to be aware of the failure or intervene to divert data to backup links. The bandwidth requirement for providing this service is on the order of that required by a single communication session, therefore a significant saving in resources is achieved.

The methodology collects information from different ongoing communication sessions, codes this information in two different ways, and transmits the coded information in two different directions on a cycle that goes over all nodes (transmitters and receivers) whose communication sessions are to be protected. The coding operation is implemented using a simple addition operation. The coding results in a significant reduction in the bandwidth, since only bandwidth requirements on the order of that required by a single communication session are needed. Receivers in each communication session receive the two coded signals. These signals, together with a simple addition operation, allow the receivers to recover the transmitted signal. This applies to all receivers in sessions with data encoded using this technique. Therefore, if there is a failure on the working paths, the signal can still be recovered without invoking any special data rerouting technique. Moreover, even if there are no failures, since two copies of the same signal are received by a receiver, one on the working path and one on the backup paths, this provides an error detection and correction technique. This added functionally comes at no additional cost. Some of the advantages provided by this method include (1) transparent protection against single link failures, (2) fast protection since no failure detection or switching are involved, (3) reduced bandwidth and resource requirements, since multiple communication sessions will be using the same resources required to protect a single session, (4) simpler control and management planes, and (5) error detection and correction.

The methodology can be used in any communication network in order to guarantee non-stop service, and transparent recovery from any single link failure without involving the control or management plane. It also provides a method for error detection and correction. Hence, the methodology may be used to provide both error control and protection against link failure.

Protection techniques are either 1+1, where a single session is protected by duplicating the resources required by the session which are used to send a second copy of the signal, and hence recovery from failures is instantaneous, or 1:N, where resources for a single session are shared between N sessions, but this requires the detection of the failure, and determining which session should use the backup facilities. The first technique is fast, but requires at least 100 percent extra resources. The second technique is more efficient, but slow since the management and control planes must be involved.

According to one aspect of the present invention, a method for protecting a network having a plurality of bidirectional connections is provided. The method includes combining data units from a plurality of bidirectional connections using network coding to form a protection signal, transmitting the protection signal over a protection circuit to thereby protect the plurality of bidirectional connections, wherein the bidirectional connections are link disjoint, and wherein the bidirectional connections are link disjoint from the protection circuit.

According to another aspect of the present invention, a system is provided which includes a plurality of bidirectional connections and a protection circuit for protecting the plurality of bidirectional connections. The plurality of bidirectional connections are link disjoint. The protection circuit is link disjoint from the plurality of bidirectional connections. The protection circuit is adapted to convey a protection signal formed by combining data units from the plurality of bidirectional connections using network coding to thereby protect the plurality of bidirectional connections.

According to another aspect of the present invention, a system is provided which includes a plurality of bidirectional connections, and a protection circuit for protecting the plurality of bidirectional connections. The protection circuit is implemented by a p-Cycle. The plurality of bidirectional connections are link disjoint. The protection circuit is link disjoint from the plurality of bidirectional connections. There is a means for forming a protection signal by combining data units from the plurality of bidirectional connections using network coding to thereby protect the plurality of bidirectional connections.

According to another aspect of the present invention, a system is provided which includes a plurality of bidirectional connections, and a protection circuit for protecting the plurality of bidirectional connections. The protection circuit is implemented by a protection path. The plurality of bidirectional connections are link disjoint. The protection circuit is link disjoint from the plurality of bidirectional connections. There is a means for forming a protection signal by combining data units from the plurality of bidirectional connections using network coding to thereby protect the plurality of bidirectional connections.

BRIEF DESCRIPTION OF THE DRAWINGS

FIG. 1A a cycle (thick lines) traversing nodes A-G, and protecting circuits (thin lines) on the same physical path as the cycle, and on straddling paths; FIG. 1B protection of a failure on the cycle; and FIG. 1C protection of a failure on the straddling path.

in FIG. 3A the sources are at $S_i$ and the destination nodes are at $T_i$ nodes; in FIG. 3B the sources are at $T_i$, and the destinations are at $S_i$ nodes.

FIG. 6 is an example of blocking data units and segmenting them to fit into fixed size data units.

DETAILED DESCRIPTION

I. INTRODUCTION

Figure 1A:
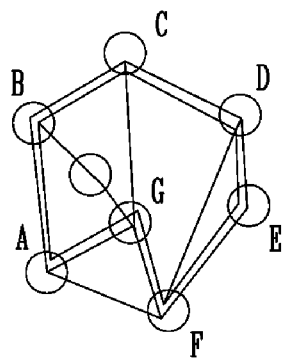
FIG. 1A-1C are diagrams illustrating the p-Cycle concept.

With the use of optical fibers in network backbones, which are usually configured as arbitrary mesh topologies, large amounts of bandwidth are provided on a single fiber, and huge amounts of traffic are carried on the fiber, especially if wavelength division multiplexing (WDM) is used. The failure of a single fiber, which is not uncommon, can therefore affect a large number of users and connections, and the effect of the failure can be catastrophic. It is therefore imperative that when any part of the network fails that the network will continue to operate. This is referred to as network survivability.

Research on techniques to provide optical network survivability has received special attention. Techniques for optical network survivability can be classified as *Predesigned Protection and Dynamic Restoration* techniques [1]. In predesigned protection, which is a proactive technique, bandwidth is reserved in advance so that when a failure takes place, backup paths (note that protection can also be applied to protect fiber lines, and is therefore called line protection; here, we consider circuit protection, where a circuit can be a full wavelength on a lightpath, or a transport capacity unit, such as, but not limited to Ds-3) which are pre-provisioned, are used to reroute the traffic affected by the failure. These techniques include the 1+1 protection, in which traffic of a lightpath is transmitted on two link disjoint paths, and the receiver selects the stronger of the two signals; 1:1 protection, which is similar to 1+1, except that traffic is not transmitted on the backup path until failure takes place; and 1:N protection, which is similar to 1:1, except that one path is used to protect N paths. A generalization of 1:N is the M:N, where M protection paths are used to protect N working paths. Protection techniques are widely used in SONET ring architectures [1]. Under dynamic restoration, which is a reactive strategy, capacity is not reserved in advance, but when a failure occurs spare capacity is discovered, and is used to reroute the traffic affected by the failure. Protection techniques can recover from failures quickly, but require significant amounts of resources. On the other hand, restoration techniques are more cost efficient, but are much slower than their protection counterparts.

Recently, the concept of p-Cycles has been introduced in [2], [3], [4], to emulate the protection techniques of SONET ring networks, and they provide 1:N protection to connections with the same transport capacity, e.g., DS-3. p-Cycles provide protection against single link failures to a connection with its two end nodes being on the cycle. However, under p-Cycles, and because of the shared protection, failures must still be detected, and traffic must be rerouted on the cycle. This can add to the failure recovery time.

The present invention provides a methodology for using p-Cycles to provide 1+N protection against single link failures in optical mesh networks. That is, to transmit signals from N connections on one common channel, such that when a failure occurs, the end nodes of the connection affected by the failure will be able to recover the signals affected by the failure. To be able to achieve this, computation is traded for communication. That is, by performing additional computations within the network, in the form of network coding, the present invention is able to achieve the desired protection. Hence, to provide survivability, failures need not be detected explicitly, and rerouting of the signal is not needed. Both the management and control planes in this case is simpler, as they only need to detect the failure for the purpose of repairing it. This strategy can be implemented at a number of layers.

The present invention provides two copies of the same signal on two disjoint paths. One path is the primary working path. The second path, however, is in fact a virtual path, which is still disjoint from the first primary path. What is meant by a virtual path is a set of paths on which the signal is transmitted with other signals, but there is enough information to recover the target signal from those transmissions. This methodology has the following properties:

1) Protection against single link failure is guaranteed.
2) p-Cycles which are typically employed for 1:N protection, are used to provide 1+N protection in the sense that a signal can be received on two link disjoint paths, such that if a link fails on one of the paths, the signal can still be received on the other path, where the backup path is shared.
3) Resuming data reception on the protection path is guaranteed to be within twice the propagation delay around a p-Cycle, but can be much less than this limit.

In addition, and as a byproduct, in the absence of failures, this methodology provides a distributed encryption strategy that uses other data units as encryption keys. It also provides an error recovery functionality in the absence of failures. These advantages will be discussed in Section V.

Here, we introduce the basic concepts and theoretical bases of the strategy, and how it can be used to provide 1+N protection using p-Cycles against single link failures. We discuss the implementation of this scheme in a number of technologies and layers in Section VI.

The rest of the detailed description is organized as follows. In Section II we provide a brief background on p-Cycles and network coding. In Section III we introduce a few operational assumptions. We illustrate the basic concept of our strategy by giving an example of using network coding to provide protection against a single link failure in Section IV. In Section V we show the general strategy for encoding and decoding data units on p-Cycles in order to provide protection for bidirectional unicast connections using one bidirectional p-Cycle. We illustrate this procedure using an example. We also outline the advantages of this scheme, as well as other uses for this scheme, especially in error control. In Section VI we discuss the issue of timing and synchronization of encoded and decoded data, and we show that the outage time, which is the time between the loss of the direct signal, and the recovery of the same signal on the protection path, is limited to no more than twice the delay on the p-Cycle. Some notes on the implementation of this strategy in different technologies and protocols will also be discussed. Section VII shows some extensions to the proposed strategy which enables it to work with multipoint sessions. Moreover, a hybrid 1+N and 1:N protection scheme is introduced in order to enable the p-Cycle to protect connections which are provisions on the links used by the cycle itself. In Section VIII we introduce an empirical comparison between 1+1 and 1+N protection. We also introduce a comparison between 1+1 and the hybrid scheme. The comparison is based on the cost of the network in terms of the number of links, and optimal formulations. In Section IX, an alternative technique is provided in which a protection path, rather than a p-cycle, can be used to carry the backup information. Finally, in Section X we conclude.

It should be pointed out that our use of p-Cycles is different from that proposed in [2], [3], [4] in the sense that we use p-Cycles to protect paths rather than links.

II. BACKGROUND

A. Background on p-Cycles

The p-Cycle concept [2], [3], [4] is similar to the Bidirectional Line-Switched Ring (BLSR), since both of them have a cyclic structure. However, the p-Cycle concept has a higher protection coverage, since the spare capacity reserved on the cycle covers working capacity on the cycle, as well as working capacity on straddling links (see FIG. 1). Since the protection capacity can be used to protect multiple connections, the p-Cycle belongs to the 1:N protection. The endpoints of the failure are responsible for detecting the failure, and for rerouting the traffic on the p-Cycle.

Figure 1B:
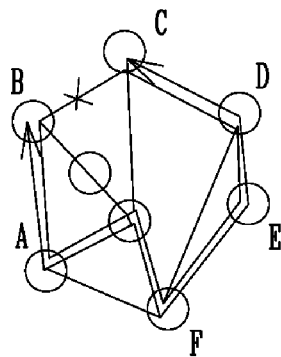
Figure 1C:
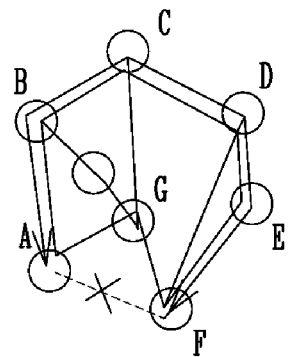

There are two types of p-Cycles: link p-Cycles, which are used to protect the working capacity of a link, and this is the type shown in FIG. 1, and node-encircling p-Cycles, which protect paths traversing a certain node against the failure of such a node.

p-Cycles are embedded in mesh networks, and several algorithms have been introduced in the literature to select the p-Cycles which consume the minimum amount of spare capacity, e.g., see Chapter 10 in [4]. p-Cycles are very efficient in protecting against link failures, and the protection capacity reserved by p-Cycles achieves an efficiency that is close to that achievable in mesh-restorable networks. However, the preprovisioning of spare capacity makes p-Cycles much faster to recover from network element failures. p-Cycles can be used at a number of layers including the Optical layer, the SONET layer, or the IP layer [5].

Here, we use p-Cycles to protect against failures in a 1+N manner, rather an 1:N. That is, our approach is to allow two transmissions of the same signal. One transmission is on the working path, and the second one is on a protection circuit, implemented by a p-Cycle. Multiple connections transmit their signals simultaneously on the p-Cycle in a bandwidth efficient manner. The receivers receive these two copies, and select the better of the two signals. The backup signals are transmitted simultaneously and on the same protection circuit using the technique of network coding. Our approach can also be used at any layer that transmits encapsulated data units including the SONET layer, especially Next Generation SONET, ATM, MPLS/GMPLS and the IP layer.

B. Background on Network Coding

Figure 2:
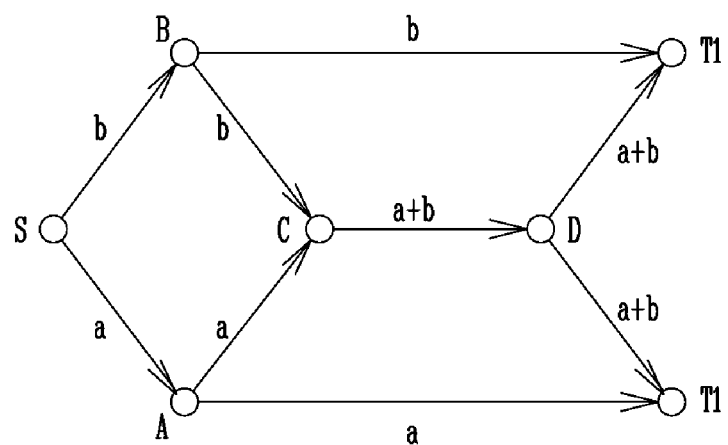
FIG. 2 is a diagram illustrating an example of network coding.

Network coding refers to performing linear coding operations on traffic carried by the network at intermediate network nodes. In this case, a node receives information from all, or some of its input links, encodes this information, and sends the information to all, or some of its output links. This approach can result in enhancing the network capacity, hence facilitating the service of sessions which cannot be otherwise accommodated. This is especially true when service mode is multicast. An example of the use of network coding is shown in FIG. 2 in which node S transmits to nodes T1 and T2, and each link in the network has a capacity of one data unit per time unit. Data units a and b are delivered to both T1 and T2 by adding a and b at node C, where the addition is modulo 2. Both a and b are recovered at T1 and T2 by adding the explicitly received data units (a and b, respectively), to a+b. The network can then achieve a capacity of two data units per time unit.

The concept of network coding for multicast sessions was introduced in the seminal paper by Ahlswede et al. [5]. The problem of network coding was formulated as a network flow problem in [6] and a link cost function was included in the formulation in [7]. Reference [8] introduced an algebraic characterization of linear coding schemes that results in a network capacity that is the same as the max-flow min-cut bound, when multicast service is used. The authors show that failures can be tolerated through a static network coding scheme under multicasting, provided that the failures do not reduce the network capacity below a target rate. Reference [9] introduced deterministic and randomized algorithms for the construction of network codes, which had polynomial time complexity. The algorithms could be used for multiple multicast sessions, where intermediate nodes may decode, and re-encode the received information. Reference [10] includes an introduction to network coding principles.

Here we provide for the use network coding with a group of unicast sessions in order to provide protection for such connections.

III. OPERATIONAL ASSUMPTIONS

In this section we introduce a number of operational assumptions. Most of these assumptions are satisfied in practice, and they do not impose any significant constraints on the operation of our strategy.

In this work we deal with connections. A connection may consist of a circuit on a single link, or may consist of a sequential set of circuits on multiple links, e.g., a lightpath. Therefore, link protection is a special case of this technique.

The term link is used to refer to, for example, a fiber connecting two nodes. Each link contains a number of circuits, e.g., wavelength channels, or even channels with smaller granularities, e.g., DS3.

A p-Cycle protecting a number of connections passes through all end nodes of such connections. In doing so, the p-Cycle protects connections with the same transport capacity unit, e.g., DS-3. Therefore, the p-Cycle links themselves have the same transport capacity.

The p-Cycle is terminated, processed, and retransmitted at all end nodes of the connections.

We assume that all connections are bidirectional.

It is assumed that data units are fixed in size (the case of variable size data units will be discussed in Section VI.)

The scheme presented is designed to protect against a single link failure. That is, when a link fails, it will be protected, and will be repaired before another link fails.

When a link carrying active circuits fails, the tail node of the link will receive empty data units.

The present invention provides for using network coding on p-Cycles to achieve 1+N protection. It is to be noted that this strategy can be implemented using a number of layers and protocols, including the Generic Framing Procedure (GFP) [11] protocols of Next Generation SONET/SDH (NGS), where data units are to be treated like packets by GFP. The strategy can also be implemented using asynchronous transfer mode (ATM), Multiprotocol Label Switching (MPLS) or Internet Protocol (IP).

It should be pointed out that all addition operations (+) described herein are modulo two additions, i.e., Exclusive-OR (XOR) operations.

IV. AN ILLUSTRATIVE EXAMPLE

In this section we illustrate the invention using a simple example. The objective is to provide each destination with two signals on two link disjoint paths, such that the network can withstand any single link failure. For the sake of exposition, we first consider unidirectional connections, and then extend it to bidirectional connections.

Figure 3A:
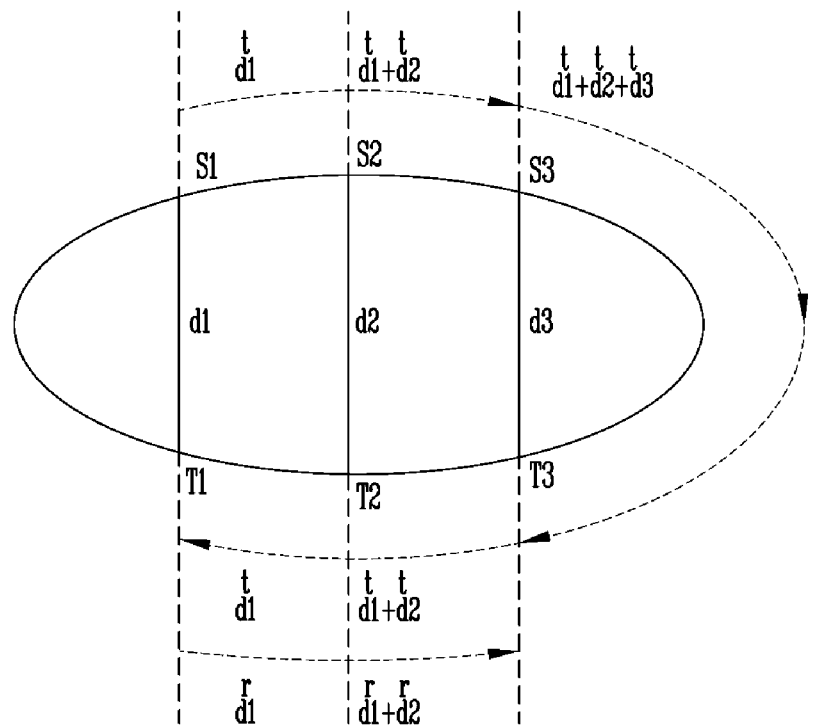
FIG. 3A-B is an example of the use of network coding on p-cycles to protect against single link failures.

The example is shown in FIG. 3A, and there are three unidirectional connections from source $S_i$ to destination $T_i$, for i=1, 2, 3. To simplify the example, we assume that all sources and their corresponding destinations are ordered from left to right. Assume that each connection requires one unit of capacity. Let us also assume that data units $d_1$, $d_2$ and $d_3$ are sent on those connections. A p-Cycle is preconfigured to include all the three sources and destinations, as shown in the figure. Data units $d_i$ will be transmitted three times: once on the primary working path, and twice, and in opposite directions on the p-Cycle. One of the transmissions on the p-Cycle is by the original transmitter of the data unit, $S_i$, and the other by the receiver, $T_i$. To distinguish between those last two data units we refer to them as transmitted and received $d_i$ units, viz., $d_i^t$, and $d_i^r$, respectively.

On the p-Cycle, the following takes place:

1) Node $S_1$ transmits $d_1^t$ in the clockwise direction. Node $S_2$ will add its own data unit, $d_2^t$ to $d_1^t$ which it receives on the p-Cycle, where the addition is modulo 2, and transmits $d_1^t+d_2^t$ on the p-Cycle, also in the clockwise direction. Node $S_3$ will repeat the same operation, and will add $d_3^t$ to $d_1^t+d_2^t$, and transmits the sum on the p-Cycle. That is, node $T_3$ receives $d_1^t+d_2^t+d_3^t$, on the p-Cycle, and in the clockwise direction.
2) On the same direction of the p-Cycle, but at the destinations, when destination $T_3$ receives $d_1^t+d_2^t+d_3^t$, and receives $d_3$ on the working path, it adds $d_3$ to $d_1^t+d_2^t+d_3^t$ to obtain $d_1^t+d_2^t$, and forwards it to $T_2$. Node $T_2$ will also add $d_2$, which it receives on the working path, to $d_1^t+d_2^t$ to recover $d_1^t$, which it transmits on the same p-Cycle to $T_1$. $T_1$ removes $d_1^t$ from the clockwise cycle.
3) Also, when node $T_1$ receives $d_1$ on the working path, it sends it on the p-Cycle, but in the counter-clockwise direction. It will be referred to as $d_1^r$. Node $T_2$, when it receives $d_2$ on the working path, it adds it to $d_1^r$, and transmits $d_1^r+d_2^r$ on the p-Cycle, also in the counter-clockwise direction.

Based on the above, it is obvious that in the absence of failures, each destination node, $T_i$, for i=1, 2, 3, receives two copies of $d_i$:

1) One copy on the primary working path, and
2) The second copy is obtained by adding $$\sum_{j=1}^{i} d_j^t,$$

which it receives on the clockwise p-Cycle to $$\sum_{j=1}^{i-1} d_j^r,$$

which it receives on the counter-clockwise cycle. This is what we refer to a virtual copy of $d_i$.

In this case, timing considerations have to be taken into account, as will be discussed in next section.

When a failure occurs, it will affect at most one working path, e.g., working path i. In this case, we assume that $T_i$ will receive an empty data unit on the working path.

Therefore, $T_i$ will be able to recover $d_i$ by using the second virtual copy described above, i.e., by adding $$\sum_{j=1}^{i} d_j^t \text{ and } \sum_{j=1}^{i-1} d_j^r.$$

A failure on the p-Cycle will not disrupt communication.

Figure 3B:
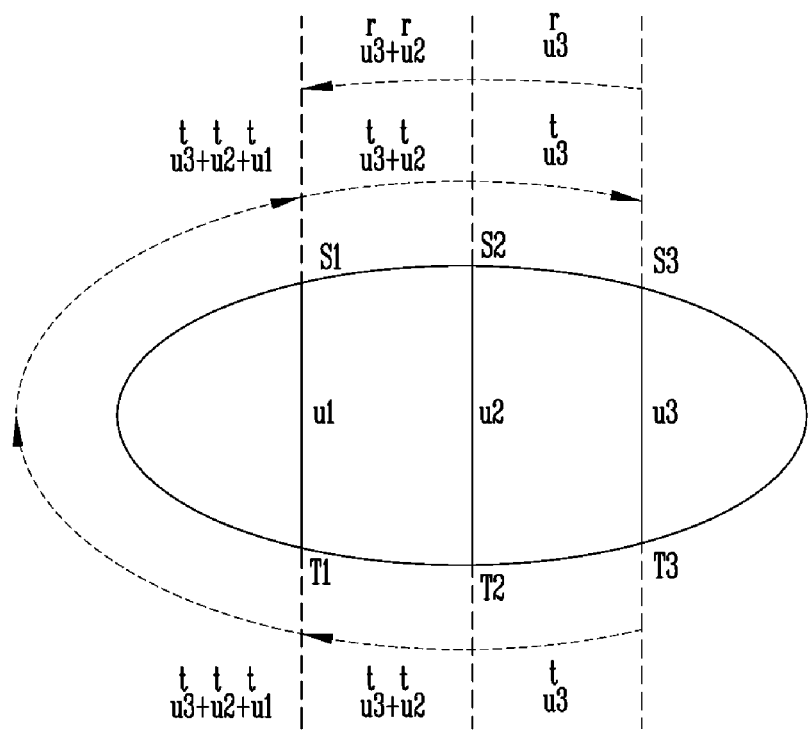

The case in which information is sent in the opposite direction, i.e., from $D_i$ to $S_i$ is shown in FIG. 3B. Data units in this case are labeled $u_i$, and similar to $d_i$ data units, $u_i^t$ and $u_i^r$ distinguish between newly transmitted and received $u_i$ data units.

We refer to a bidirectional p-Cycle as a full cycle, and a one directional cycle is a half p-Cycle. In each of the above two examples, less than a full p-Cycle is used. In order to support bidirectional communication, the two approaches above have to be combined. In this case, less than three half p-Cycles, or 1.5 full p-Cycles are used. That is, one half p-Cycle (the outer one) is shared by both $d_i^r$ and $u_i^r$ data units. However, this can be accomplished because of the ordering of $S_i$ and $T_i$ that we enforced in this example. In the general case, combining the two bidirectional sessions would require two full p-Cycles. However, by combining $u_i$ and $d_j$ signals on the same link, it is possible to reduce the number of p-Cycles to one cycle, hence the name 1+N protection. This will be illustrated in the next section.

V. NETWORK CODING STRATEGY ON P-CYCLES

In this section we introduce our general strategy for achieving 1+N protection in mesh networks using p-Cycles.

A. The Strategy

In the examples shown in the previous section, we presented a special case in which the working connections were ordered from left to right. However, in this section we introduce a strategy for general connections. We assume that there are N bidirectional unicast connections, where connection i is between nodes $A_i$ and $B_i$. We define the sets $\mathbb{A}=\{A_i|1 \leq i \leq N\}$ and $\mathbb{B}=\{B_i|1 \leq i \leq N\}$ (Note that the choice of the labels $A_i$ and $B_i$ is arbitrary, as long as $A_i$ and $B_i$ communicate with each other). We denote the data units transmitted from nodes in $\mathbb{A}$ to nodes in $\mathbb{B}$ as d units, and the data units transmitted from nodes in $\mathbb{B}$ to nodes in $\mathbb{A}$ as u units.

Before describing the procedure, it should be pointed out that the basic principle for receiving a second copy of data unit, e.g., $u_i^l$ by node $A_i$, is to receive on two opposite directions the signals given by the following two equations:

$$\sum_{j, A_j \in A'} u'_j \quad (1)$$

$$u'_j + \sum_{j, A_j \in A'} u'_j \quad (2)$$

for some $A' \subset A$, $A_i \notin A'$, where data unit $u_j^l$ is the one to be received by $A_j$, and the sum is modulo 2. In this case, $A_i$ can recover $u_i^l$ by adding equations (1) and (2) using modulo 2 addition also.

Our procedure goes through the following steps:

A.1 p-Cycle Construction and Node Assignment to Cycles:

1) Find a full p-Cycle. The full p-Cycle consists of two unidirectional half p-Cycles in opposite directions (more on this in item 3 below) (We assume that such p-Cycles exist, but if they do not exist, we find the largest subset of connections for which such p-Cycles exist, and then apply the strategy to those connections). These two p-Cycles do not have to traverse the same links, but must traverse the nodes in the same order.

Figure 4:
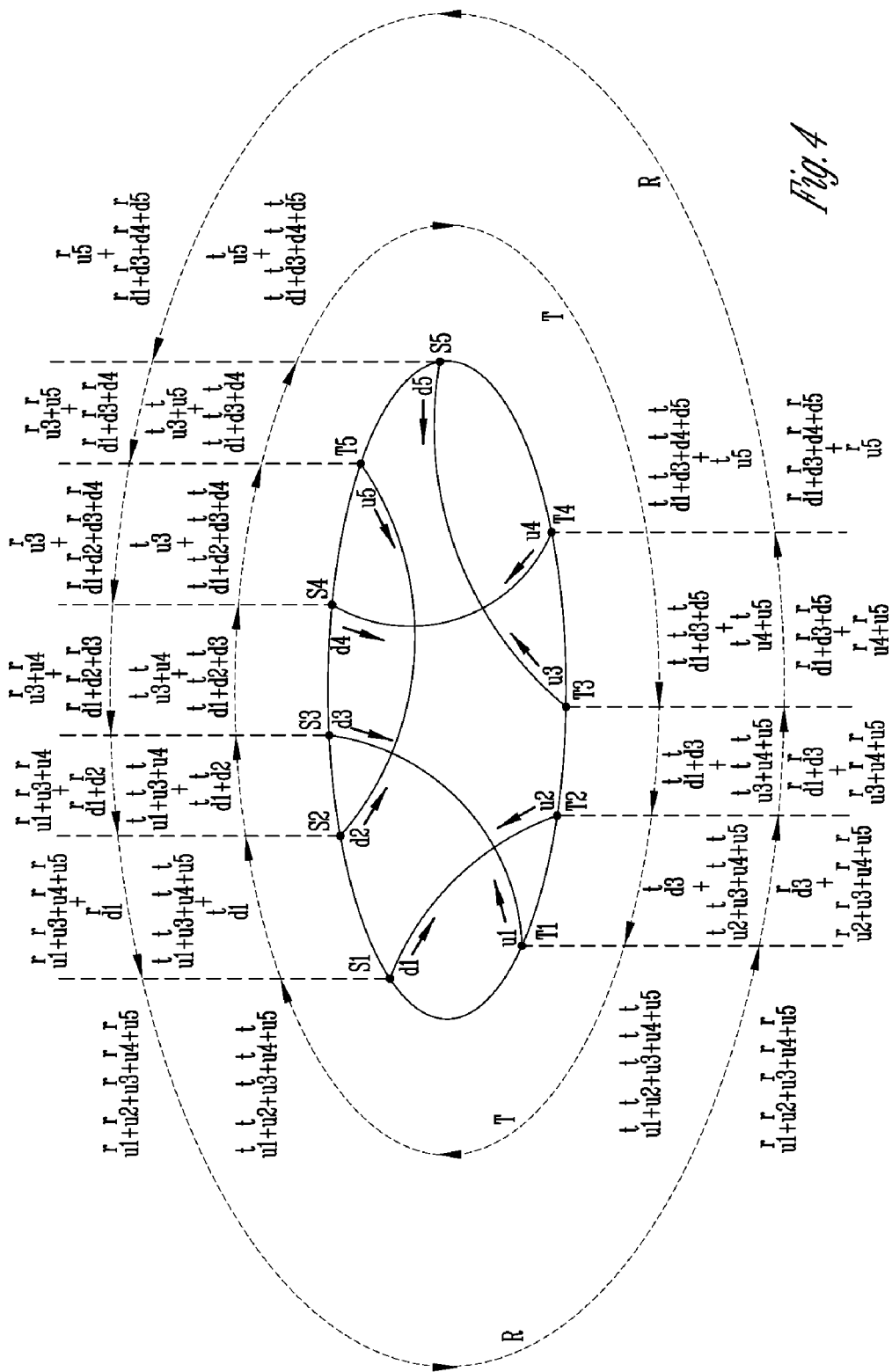
FIG. 4 is an example of the application of the network coding procedure to a p-Cycle.

2) Construct two sequences of nodes, $S=(S_1, S_2, :::, S_N)$ and $T=(T_1, T_2, :::, T_N)$ of equal lengths, N. All elements of $S$ and $T$ are in $C = A \cup B$, such that if two nodes communicate, then they must be in different sequences. We use the simple procedure shown in Algorithm 1 to construct the sequences. We arbitrarily select the sequence of nodes in $S$ to be in the clockwise direction, and the sequence of nodes in $T$ to be in the counter-clockwise direction. We also start with any node (the selection of the node to be labeled $S_1$ is important in bounding the delay to recover from lost data due to failures, and also the outage time. This issue will be discussed in Section VI) in $C$ as $S_1$, and we label this node as $A_1$. All nodes in S belong to the set $A$, and all nodes in $T$ belong to the set $B$. Node $T_1$ will always be the one to the left of node $S_1$. The example in FIG. 4 shows how ten nodes, in five connections are assigned to $S$ and $T$. A node $S_i$ in S ($T_i$ in T) transmits $d_i$ ($u_i$) data units to a node in $T$ ($S$).

ALGORITHM 1

Algorithm for constructing the sequences $S$ and $T$

Initialization:
  $S = T = ( )$;   // initialize empty sequences
  $i = 1, j = N$;
  $C = A \cup B$
  $S_1 = A_1$
  // select first node in $S$, and traverse p-Cycles
  $i = i + 1$;
  $C = C - \{A_1\}$;

while $C \neq \emptyset$ do

ALGORITHM 1-continued

Algorithm for constructing the sequences $S$ and $T$ c = next node of p – Cycles in clockwise direction;
  if c communicates with a node in S then
    $T_j = c$;
    $j = j - 1$;
  else
    $S_i = c$;
    $i = i - 1$;
  $C = C - \{c\}$;

3) The two half p-Cycles are a clockwise half p-Cycle, and a counter-clockwise half p-Cycle, which are used as follows:

a) A half p-Cycle in the clockwise direction, T. On this half cycle newly generated $d_i$ units generated by nodes in S, and newly generated $u_i$ units generated by nodes in $T$ are encoded and transmitted as $d_i^t$ and $u_i^t$, respectively. The $d_i^t$ and $u_i^t$ data units are decoded and removed by the corresponding receivers in $T$ and $S$, respectively.

b) A half p-Cycle in the counter-clockwise direction, R. On this half cycle, $d_i$ units received on the primary working paths by nodes in $T$, and $u_i$ data units received, also on the primary working paths, by nodes in $S$ are encoded and transmitted as $d_i^r$ and $u_i^r$, respectively. The $d_i^r$ and $u_i^r$ data units are decoded and removed by the corresponding transmitters in $S$ and $T$, respectively.

Note that the encoding and decoding operations referred to above are simple modulo-2 addition operations of data units to be transmitted and the data units received on such cycles, as will be explained below.

The transmissions occur in rounds, such that $d_i^t$ data units which are encoded together and transmitted on the p-Cycle must belong to the same round. Rounds can be started by the $S_1$ node, and are then followed by other nodes. All nodes in $S$ and $T$ must keep track of round numbers. The same round number conditions apply to rounds in which sums of $u_i^t$ data units are transmitted, as well as rounds for transmitting sums of $d_i^r$, and sums of $u_i^r$ data units.

A.2 Encoding Operations:

The network encoding operation is executed by the nodes in $S$ and $T$ as follows (assuming no link failures):

1) Node $S_i$:
  a) The node will add the following data units to the signal received on T:
    Data unit $d_i^t$, which is newly generated by $S_i$.
    Data unit $u_j^t$, which is received on the primary path from $T_j$. The result is transmitted on the outgoing link in T.
  b) The node will add the following data units to the signal received on R, and will transmit the result on the outgoing link in R.
    Data unit $d_i^r$, which it transmitted in an earlier round.
    Data unit $u_j^r$, which it received on the primary path from $T_j$.

2) Node $T_i$ will perform similar operations:
  a) The node will add the following data units to the signal received on T:
    Data unit $u_i^t$, which is newly generated by $T_i$, and Data unit $d_j^t$, which is received on the primary path from $S_j$. The result is transmitted on the outgoing link in T.
b) The node will add the following data units to the signal received on R:
   Data unit $u_i^r$, which it transmitted in an earlier round.
   Data unit $d_j^r$, which it received on the primary path from $T_j$. Also, the result is transmitted on the outgoing link in R.

To understand the encoding and decoding operations, we first define the following:
   $T(S_i)$: node in $\mathcal{T}$ transmitting and receiving from $S_i$.
   $S(T_i)$: node in $\mathcal{S}$ transmitting and receiving from $T_i$.
   $D(Tx)_i$=sum of d data units transmitted by $S_1$, $S_2$, ::: , $S_i$ in round n and by $S_{i+1}$, $S_{i+2}$, ..., $S_N$ in round n-1 on half cycle T which have not yet been removed by their corresponding receivers in $\mathcal{T}$. a is the delay over the p-cycle in terms of packet transmission times.
   $U(Tx)_i$=sum of u data units transmitted by $T_i$, $T_{i+1}$; ::: , $T_N$ in round n and by $T_1$, $T_2$, ..., $T_{i-1}$ in round n-a on half cycle T which have not yet been removed by their corresponding receivers in $\mathcal{S}$. a is the delay over the p-cycle in terms of packet transmission times.
   $U(Rx)_i$=sum of u data units received by $S_i$, $S_{i+1}$, ::: , $S_N$ in round n and by nodes $S_1$, $S_2$, ..., in round n-a on half cycle R which have not yet been removed by their corresponding receivers in $\mathcal{T}$.
   $D(Rx)_i$=sum of d data units received by $T_1$, $T_2$, ::: , $T_i$ in round n and by nodes $S_{i+1}$, $S_{i+2}$, $S_N$ in round n-a on half cycle R which have not yet been removed by their corresponding receivers in $\mathcal{S}$.

It should be noted that all data units in each of the above sums have the same sequence number, as explained above.

Now, the above procedure can be explained as follows, with the help of the example in FIG. 4:

1) In step 1a above, node $S_i$ receives $D(Tx)_{i-1}+U(Tx)_j$ on the incoming link on T. Node $T_j$ is the node next to $S_i$ in the counter-clockwise direction. For example, for $S_2$ in FIG. 4, it is $T_1$, and for $S_5$, it is $T_5$. The addition operations will add $d_i$ to $D(Tx)_{i-1}$, and will remove $uT(S_i)$ from $U(Tx)_j$. This will result in $D(Tx)_i+U(Tx)_j$ at the output of node $S_i$, which will be transmitted on the outgoing link on T. Node $S_3$ in FIG. 4 adds $d_3$, which is transmitted on the outgoing link. However, adding $u_1$, where $T(S_3)=T_1$, removes it and is therefore not transmitted on T.

2) Also, in step 1b, node $S_i$ receives $U(Rx)_{i+1}+D(Rx)_j$ on the incoming link on R. Node $T_j$ is the node in $\mathcal{T}$ which is next to $S_i$ in the clockwise direction. For example, in FIG. 4, for $S_3$ it is $T_5$, and for $S_5$, it is $T_4$. After the addition operation, $uT(S_i)$ is added, and $d_i$ is removed. The node outputs $U(Rx)_i+D(Rx)_j$ on R. In FIG. 4, at node $S_3$, the addition of $d_3$ to the incoming signal on R removes it, while the addition of $u_1$, where $T_1=T(S_3)$ adds it to the signal which is transmitted on the outgoing link on R.

3) In step 2a, node $T_i$ receives $U(Tx)_{i+1}+D(Tx)_j$ on the incoming link of T, where node $S_j$ is the node in $\mathcal{S}$ next to $T_i$ in the counter-clockwise direction. For example, in FIG. 4, for $T_3$ it is node $S_5$. The addition operation adds $u_i$, and removes $d_j$, where $S_j=S(T_i)$, and produces $U(Tx)_i+D(Tx)_j$, which is transmitted on the outgoing link of T. In FIG. 4, $T_2$ adds $u_2$, and removes $d_1$.

4) Finally, in step 2b, node $T_i$ receives $D(Rx)_{i-1}+U(Rx)_j$ on the incoming link of R, where $S_j$ is the node next to $T_i$ in the clockwise direction. For example, for $T_5$, it is $S_5$, and for $T_3$, it is $S_1$. The addition operation adds $d_i$, and removes $u_i$, where $S_j=S(T_i)$. The result is $D(Rx)_i+U(Rx)_j$, which is transmitted on the outgoing link of R. In FIG. 4, $T_3$ adds $d_5$, and removes $u_3$.

A.3 Recovery from Failures:

The strategy presented herein recovers from a single link failure on any of the N primary paths. Suppose that a link on the path between nodes $S_i$ and $T_j$ fails. In this case, $S_i$ does not receive $u_j$ on the primary path. However, it can recover $u_j$ by adding
   $D(Tx)_{i-1}+U(Tx)_j$ which is received on T,
   $U(Rx)_{i+1}+D(Rx)_j$, that it receives on R, and
   $d_i$ that it generated and transmitted earlier.

For example, at node $S_3$ in FIG. 4, adding the signal received on T to the signal received on R, and $d_3$, then $u_1$ can be recovered, since $T_1=T(S_3)$ generated $u_1$.

Similarly, node $T_j$ can recover $d_i$ by adding
   $U(Tx)_{i+1}+D(Tx)j$ which it receives on T,
   $D(Rx)_{i-1}+U(Rx)_j$ which is received on R, and
   $u_i$ that it generated and transmitted earlier.

Node $T_2$ adds the signals on T and R, and the $u_2$ it generated earlier to recover $d_1$. Note that the signals on T and R which are added together must have the same round number, as explained earlier.

B. Advantages of the Proposed Strategy

The proposed strategy has a number of advantages, which can be summarized as follows:

The strategy provides 1+N protection against single link failures, in which the protection resources are shared between connections, hence resulting in a potential reduction of the protection circuits over 1+1 protection. This is especially evident in cases where the nodal degree is high, e.g., four, such as in the NJ-LATA and Pan-European COST239 networks.

Receiving nodes would receive the same signal on two different paths, and can therefore select the stronger of the two signals, i.e., they do not need to detect the location of the failure.

The management and control planes will be simplified since they do not need to detect the location of the failure, or reroute the signals in order to be able detect and recover from the failure.

Since signals will be received twice, and on two different paths, this strategy can also be used for error detection and correction.

Since data units are added together on the p-Cycle, data units encrypt each other, which provides a measure of security on the shared protection circuits at no additional cost. This requires that the number of connections protected by a p-Cycle be greater than 2 (more on this in Section VI-C).

VI. IMPLEMENTATION CONSIDERATIONS

In this section we consider issues that need to be taken into account for implementing the above strategy. These include timing considerations, security issues, and protocol implementation.

A. Timing Considerations

For the above procedure to work properly, $u_i$ units added and removed at a node should be the same as those carried by the p-Cycle. For this reason, nodes operate in rounds, where in round n, $u_i$ units belonging to this round are added or deleted. The same thing applies to $d_i$ units.

Node $S_1$ can start the first round (The start of rounds can be indicated in different ways depending on the protocol) on T, and the remaining nodes $\mathcal{S}$ and $\mathcal{T}$ follow. When data in the first round arrives at node $T_1$ on the working circuits, it starts transmitting data received in round 1 on R, and all the nodes in $\mathcal{T}$ and $\mathcal{S}$ follow. Since primary paths are usually chosen as the shortest paths, therefore, data arriving at a destination node over the primary path will do so before data sent over the p-Cycle will arrive. Moreover, the primary path will have a delay which does not exceed $\tau$, where $\tau$ is the propagation delay around the p-Cycle. Otherwise, the primary path will choose the shorter path over the cycle.

There is a number of timing and delay issues that need to be considered:

1) Failure-Free Operation:

Under the above assumption of the primary path being shorter than any secondary backup path, nodes in S and T will respectively receive their $u_i$ and $d_i$ data units on the primary paths before they receive them on the backup paths. In this case, data units can be added to, and removed from the corresponding half p-Cycles without delay (In case the working path is longer than the backup path on the p-Cycle, the signals on the T half cycle can be delayed until the corresponding $u_i$ and $d_i$ data units are received).

2) Operation Under Working Path Failure:

Assume that the working path between nodes $S_j$ and $T_k$ has failed. All other nodes will not be affected by this failure. Let us first consider the case of receiving $d_i$ data units by $T_k$. Nodes in S can transmit their $d_i$ data units on T in the corresponding cycles, and $d_i$ data units must be removed by their corresponding receivers in T. This can be done by all nodes similar to case 1 above.

Figure 5:
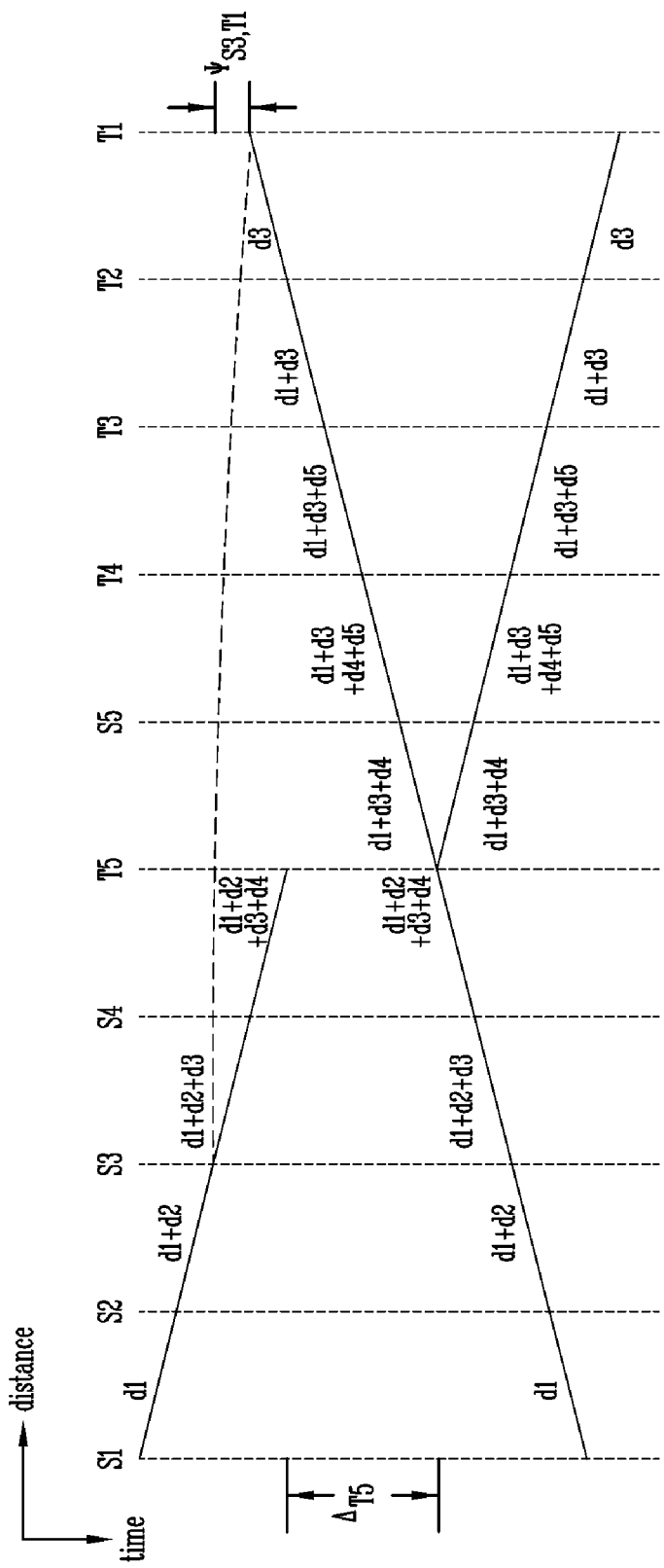
FIG. 5 is an example of the timing considerations, and delay at $T_k$ nodes ($T_k = T_5$ in this example).

However, for node $T_k$, $d_i$ data units in cycle n received on T may have to be delayed at $T_k$ until $d_i$ data units in cycle n on R arrive at $T_k$. An example of this case is shown in FIG. 5, where a delay is introduced at node $T_5$, assuming that the working circuit between nodes nodes $S_2$ and $T_5$ in FIG. 4 has failed. This delay is given by:

$$\text{Delay at } T_k = \psi^* + \tau_{T_1,T_k}^R - \tau_{S_1,T_k}^S$$

where $\psi^*$ is the maximum delay over working paths, $\tau_{T_1,T_k}^R$ is the delay between $T_1$ and $T_k$ on the R cycle, while $\tau_{S_1,T_k}^S$ is the delay between $S_1$ and $T_k$ on the S cycle. Since $\psi^* < \tau$, where $\tau$ is the total p-Cycle delay, then $$\text{Delay at } T_k < 2\tau$$

On the other hand, ui signals on the T cycle need not be delayed. A delay, if introduced, should be at node $S_1$. However, if the delay at $T_5$ is qual to $1\tau$, then an additional delay may need to be introduced at node $S_1$. In order to overcome the problem of distributing the delays between $S_j$ and $T_k$, it is easier to introduce a delay of $2\tau$ at one of the nodes only, either $S_j$ or $T_k$. Therefore, the maximum outage time, i.e. the delay to receive the backup copy of the data transmitted when the primary working path fails, is $2\tau$. MSPP devices which can accommodate a 128 ms differential delay can support this implementation.

B. Security Issues

One of the issues which may arise in this strategy is security. Since all receivers receive copies of all other transmissions, there is a concern that nodes may be able to retrieve data units from other transmissions. However, when the number of transmission sessions is greater than two, this is not possible. The reason is that if there are N transmissions, each data unit is encoded using N−1 other data units. Hence, if N>2, it is not possible for a node to recover another data unit without knowing the other N−2 data units. The condition of N>2 is a necessary and sufficient condition for the security of this mechanism. This, however, requires that no trivial data units, e.g., empty data units, be transmitted. In order to prevent this from happening, when no data units are available for transmission, random bits are generated and transmitted, with an indication to the receiver that such a data unit is actually an empty one.

C. Implementation Notes

The present invention can be implemented in a number of technologies and at a number of layers. For example, it can be implemented at layer 1 using NGS protocols, and in particular the GFP protocol. Since data units from different higher layer protocols are encapsulated in the payload field of GFP frames, the payload field can be used to accommodate the encoded (added) data units. It can also be implemented at layer 2 using ATM, where a special VCI/VPI can be reserved for a p-Cycle that protects a given set of VCCs or VPCs. The payloads of the ATM cells to be protected are therefore added and transmitted on the p-Cycle VCC. Moreover, it can be implemented at layer 3, and in particular using the IP protocol. With IP, the sum of data units (packets in this case) can be encapsulated in another IP packet. The encapsulating IP packet header would include the IP numbers (on two different interfaces) of the node that starts a round, e.g., $S_1$, as both the source and destination. Source routing may have to be used to make sure that this packet will traverse the p-Cycle.

Note that the proposed methodology uses four mechanisms:

1) Data units are fixed in size, and are of the same size for all sessions,
2) There is a provision to indicate round numbers and the round number of each data unit received on the T and R cycles,
3) There is an XOR addition mechanism at each node, and
4) There is a buffer equal to the round trip delay around the p-Cycle at each node. The last two mechanisms are not difficult to provision.

In order to implement the first mechanism, and if data units cannot be made fixed in size, e.g., under IP, a number of ways can be used to circumvent this problem. One option would be that each node would concatenate (or block) its own data units and then segment them into fixed size segments (see FIG. 6). This means that, depending on the size of data units, a segment may consist of one data unit, part of a data unit, or a number of data units, which may include one or two partial data units. Another option would be to add data units based on the data unit with the largest size. Shorter data units are extended by adding trailing zeroes. The first option requires some processing, but is efficient in terms of bandwidth utilization. The second option, which is also feasible under a number of technologies, can lead to bandwidth degradation since the bandwidth reserved for protection in this case will be based on the maximum size data units. However, since it does not require blocking and segmentation, its processing requirements are less than those of the first option.

Providing round number can be also accommodated in a number of technologies. For example, when using GFP, a new extension header can be defined to include the round sequence number. With IP, the sequence number of the encapsulating IP header can act as the sequence number.

VII. EXTENSIONS

A. Multipoint Connections

If a node acts as a source or a destination of multiple connections, the same scheme described above can still be employed as follows:

1) One-to-Many Sessions: We illustrate the procedure for handling one-to-many, or multicast, sessions by considering the case of the transmission of $d_i$ units from node $S_i$ in $\mathcal{S}$ to multiple destination nodes in $\mathcal{T}$. A similar procedure can be implemented for transmissions from a node on $\mathcal{T}$ to nodes in $s$. We denote by $T_c$ and $T_f$ the destinations in the session that are, respectively, the closest and the farthest from the session source in $s$ on the T cycle in the clockwise direction. These two nodes have the following responsibilities:

Node $T_c$ adds data units $d_i$ to the R cycle. It does not act on the data received on the T cycle.

Node $T_f$ removes data units $d_i$ from the T cycle. It does not act on the data received on the R cycle.

Figure 7:
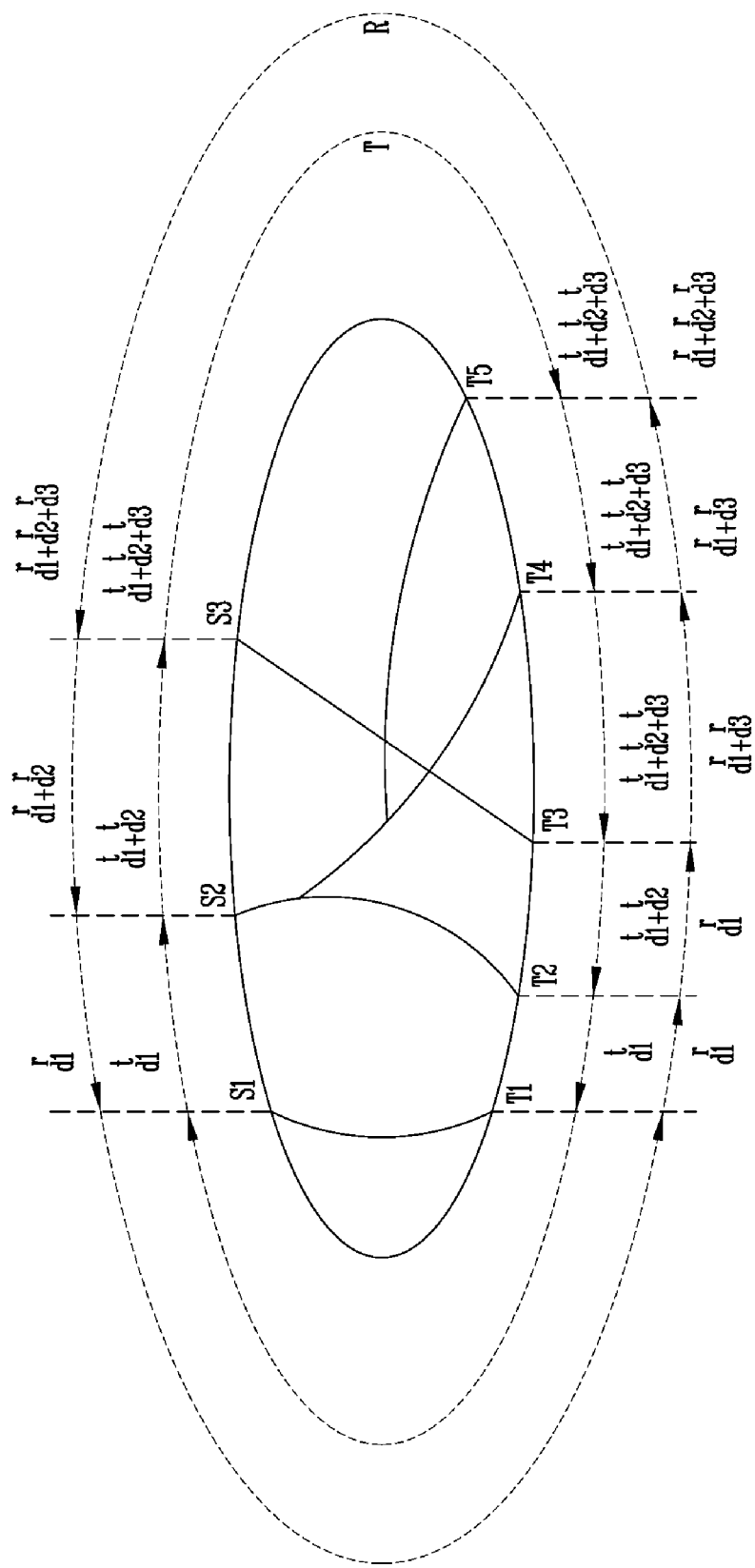
FIG. 7 is a diagram illustrating 1+N protection of multicast connections.
Figure 8:
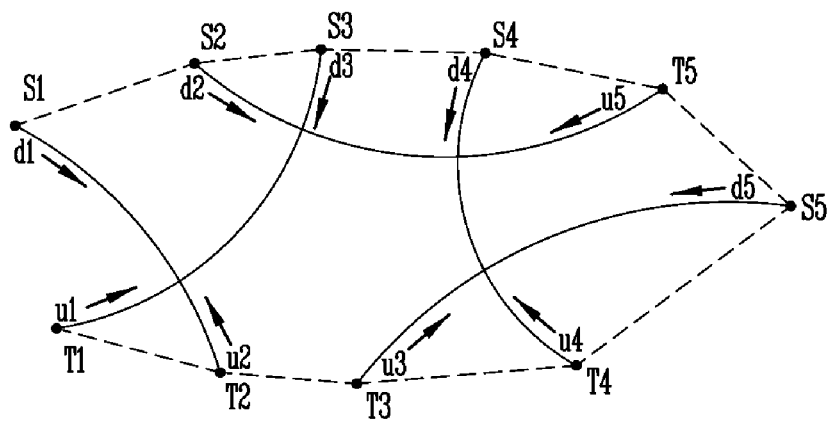
FIG. 8 illustrates an example of enumerating the nodes in five connections.
Figure 9:
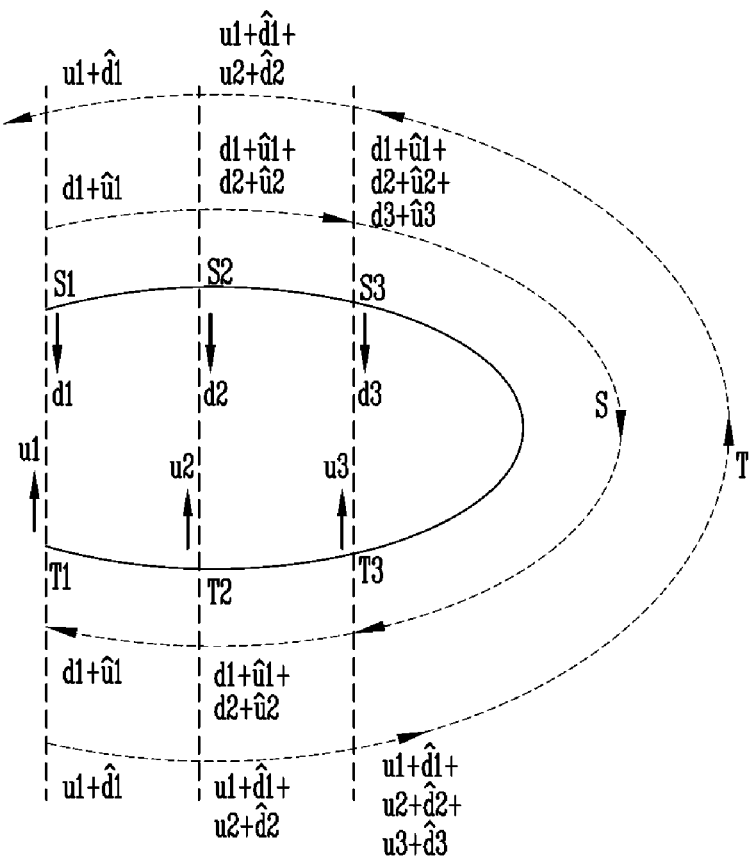
FIG. 9 illustrates an example of network coding-based protection using a protection path.

Based on the above, in the case of failure all destination nodes in the multicast session will receive $\Sigma_{j,sj \in B, J \neq 1} d_j + d_i$ on cycle T, and $\Sigma_{j,sj \in B, j \neq i} d_j$ on cycle R, where B is a subset of S. This enables such destinations to recover the $d_i$ units in case of failure. This is shown in the example in FIG. 7 where $S_2$ transmits data units $d_2$ to $T_2$, $T_4$ and $T_5$.

The above may require buffering data on the T cycle at $T_f$ until data in the corresponding round arrives from upstream on the R cycle. Or, it may require buffering data on the R cycle at $T_c$ until data in the corresponding round arrives from upstream on the T cycle. Buffering at both nodes is not required.

Note that the above strategy can tolerate the failure of multiple links on the multicast tree from $S_i$ to its destinations in $\mathcal{T}$.

2) *Many-to-One Sessions:* In the case of many-to-one sessions, the adaptation of the proposed strategy is straightforward. In this case, the destination node can be regarded as multiple destinations, and it applies the basic strategies m times, where m is the number of sources in the session. For this strategy to work, all paths from the sources to the destination must be link disjoint.

B. *Hybrid 1:N and 1:N Protection*

Unlike p-Cycles used for 1:N protection, the 1+N protection scheme proposed in this paper does not protect circuits which share links with the p-Cycle. The reason is due to the use of network coding on the p-Cycle. However, the 1+N protection scheme can be combined with a 1:N protection scheme for circuits sharing links with the p-Cycle. In case a working link on the p-Cycle failes, in the case network coding is disabled, and the circuits sharing links with the p-Cycle can be rerouted on the p-Cycle, hence providing 1:N protection for such circuits. We refer to this strategy as a hybrid 1+N and 1:N protection. It should be noted that in the worst case, this hybrid strategy degenerates to the 1:N protection, and therefore it is guaranteed not to be worse than 1:N protection.

VIII. COST EVALUATION OF 1+N PROTECTION

In this section we evaluate the cost of 1+N protection using p-Cycles, and compare it to the cost of 1+1 protection, as well as 1:N protection using p-Cycles. The cost evaluation of 1+1 and 1+N protection is based on optimal interger linear programming formulations. These will be used to carry out an empirical comparison between the cost of implementing both strategies.

We compare the cost of implementing 1+1 and 1+N protection strategies using random graphs, while assuming that there is no upper bound on the number of links per span. In our experiments, we allowed the use of non-simple cycles. Therefore, and due to the complexity of the problem, we ran our experiments using 8-node networks. The networks were generated randomly such that each sample network contained a given number of edges, and that the network is at least bi-connected. For the generated network, we provisioned a given number of connections, such that the end points of the connections were uniformly selected from all the nodes in the network. For each experiment, we generated 10 sample networks, and calculated the average of the number of protection and working circuits over all the runs. In the examples below, we show the total number of wavelength links, and between parentheses we show the number of protection and working circuits, respectively.

In the first example, shown in Table I, the network has 8 nodes, and 12 edges. The average nodal degree in this case is 3. In the examples, we show the total cost of protection, and the cost of primary and protection paths are, respectively shown between parentheses. Table shows that 1+1 protection performs better than 1+N protection, both in terms of the number of working and protection circuits. Notice that when the number of connections is equal to the number of links in the graph (the case referred to as link), i.e., link protection was, the number of working circuits is exactly the same in both cases, but the number of protection circuits is about 15% more in the case of 1+N. That is, 1+N protection has no advantages in this case. However, as the network becomes denser, 1+N protection will require fewer circuits than 1+1 protection. This is shown in Table II, where the nodal degree in this case is 4. Although the number of protection circuits exceeds the number of working circuits under 1+N protection, but the cost of protection circuits under 1+N protection is at least 30% lower than that under 1+1 protection. In Table III we show the cost of 1+1 and 1+N protection when link protection for all links in the network is provided. Four networks were considered, two six node networks, with 10 and 12 edges respectively, and two eight node networks, similar to those in Tables I and II with 12 and 16 edges, respectively. In these examples, and similar to the conclusion drawn from the above two examples, it is shown that the cost of 1+N protection becomes less than the cost of 1+1 protection as the network density increases. It is to be noted that there is a large number of networks with a high nodal degree, i.e., 4 or more. Examples of which include the NJ-LATA with a nodal degree of 4, and the Pan-European COST239 network with a nodal degree of 4.7. Such networks may be regarded as candidates for the use of the proposed strategy.

It is to be noted, however, that the maximum number of links per span under 1+N protection is less than under 1+1 protection. For example, for a network of 8 nodes and 12 edges, protecting 10 connections using 1+1 protection required several spans to be provisioned with 5 links on the same span. With 1+N protection, however, only one span needed to be provisioned with 4 links, and the rest were provisioned with either 1 or 2 spans. This means that restricting the number of links per span to a certain upper bound may change the cost significantly. This is the subject of future study. We also illustrate the cost of the Hybrid 1+N/1:N protection, and compare it to the cost of 1+1 protection. The cost of the Hybrid 1+N/1:N protection is based on using an ILP formulation, which is similar to that in [16]. However, we modified the formulation in [16] in order to also maximize the number of links which are protected using 1+N protection, without resulting in increasing the number of protection circuits. The experiments considered a number of networks where the number of nodes assumed two values, 8 and 14 nodes. We allowed the graph density for each network to assume one of four values, namely, 1, 1.5, 2 and 2.5. The graphs were generated randomly, but we made sure that all graphs were at least bi-connected. For each network, 8 different random graphs were generated, and we took the average of the results.

In Table IV, we show the cost of the protection circuits required for both 1+1 and Hybrid 1+N/1:N protection. For the Hybrid 1+N/1:N protection, the number of links which are protected as straddling links is also shown.

Under 1+1 protection, the worst case cost of protection circuits is always when the nodal degree is 2, i.e., the network has a ring topology. There is exactly one way of choosing the protection path, namely, the entire ring topology excluding the protected link. However, under Hybrid 1+N protection, the problem reduces to p-Cycle protection, where all the protected links are on-cycle links, and the cycle corresponds to the entire graph. This results in the largest percentage of protection circuits, 100%. Note that in this case, for the Hybrid 1+N protection, there are no 1+N protected links, and it is 1:N protection. As the number of edges increases, and consequently the nodal degrees, the cost of 1+1 protection remains high, which is always around 200% of the cost of working links. Under Hybrid 1+N protection, the ratio of the protection circuits to the working circuits decreases. Notice also that as the number of edges increases, the number of links which are 1+N protected, i.e., straddling links, also increases. For example, with a graph density of 4, at least 50% of the links are protected using 1+N protection, since they are straddling links. The remaining links are 1:N protected.

TABLE I

COMPARISON BETWEEN 1 + 1 AND 1 + N PROTECTION FOR THE CASE OF AN 8 -NODE AND 12-EDGE NETWORK

|  | 1 + 1 | | | 1 + N | | |
| --- | --- | --- | --- | --- | --- | --- |
| # connecrions | Total | Working | Spare | Total | Working | Spare |
| 12 (link) | 39 | 12 | 27 | 43 | 12 | 31 |
| 10 | 41 | 16 | 25 | 50 | 24 | 26 |
| 8 | 31 | 12 | 19 | 37 | 13 | 24 |

TABLE II

COMPARISON BETWEEN 1 + 1 AND 1 + N PROTECTION FOR THE CASE OF AN 8-NODE AND 16-EDGE NETWORK

| # | 1 + 1 | | | 1 + N | | |
| --- | --- | --- | --- | --- | --- | --- |
| connections | Total | Working | Spare | Total | Working | Spare |
| 6 (link) | 51 | 16 | 35 | 39 | 16 | 23 |
| 14 | 49 | 19 | 36 | 45 | 20 | 25 |
| 12 | 44 | 18 | 26 | 34 | 16 | 18 |

TABLE III

FULL LINK PROTECTION

|  |  | 1 + 1 | | | 1 + N | | |
| --- | --- | --- | --- | --- | --- | --- | --- |
| N | E | Total | Working | Spare | Total | Working | Spare |
| 6 | 10 | 30 | 10 | 20 | 30 | 10 | 20 |
|  | 12 | 36 | 12 | 24 | 26 | 12 | 14 |
| 8 | 12 | 39 | 12 | 27 | 43 | 12 | 31 |
|  | 16 | 51 | 16 | 35 | 39 | 16 | 23 |

TABLE IV

COMPARISON BETWEEN 1 + 1 AND HYBRID 1 + N PROTECTION

|  |  | 1 + 1 Protection | Hybrid 1 + N/1:N Protection | |
| --- | --- | --- | --- | --- |
| |V| | |E| | protection cost | protection cost | # straddling links |
| 8 | 8 | 56 | 8 | 0 |
|  | 12 | 30 | 9 | 4 |
|  | 16 | 32 | 8 | 8 |
|  | 20 | 40 | 8 | 12 |
|  | 14 | 182 | 14 | 0 |

TABLE IV-continued

COMPARISON BETWEEN 1 + 1 AND HYBRID 1 + N PROTECTION

|  |  | 1 + 1 Protection | Hybrid 1 + N/1:N Protection | |
| --- | --- | --- | --- | --- |
| |V| | |E| | protection cost | protection cost | # straddling links |
| 14 | 21 | 65 | 16 | 6 |
|  | 28 | 56 | 20 | 19 |
|  | 35 | 70 | 15 | 24 |

IX. REVISED TECHNIQUE FOR 1+N PROTECTION

The present invention contemplates variations in the strategy for implementing network coding-based protection in arbitrary mesh networks. The approach described in this section provides protection against single link failures using a protection path rather than a p-cycle.

TABLE V

LIST OF SYMBOLS

| Symbol | Meaning |
| --- | --- |
| $\mathcal{N}$ | set of connections to be protected |
| N | number of connections = |$\mathcal{N}$| |
| M | total number of failures to be presented against |
| $\mathcal{S}, \mathcal{T}$ | two disjoint sequences of communicating nodes, such that a node in $\mathcal{S}$ communicates with a node in $\mathcal{T}$ |
| $S_i, T_j$ | nodes in $\mathcal{S}$ and $\mathcal{T}$, respectively |
| $d_i, u_j$ | data units sent by nodes $S_i$ and $T_j$, respectively |
| $\tilde{d}_i, \tilde{u}_j$ | received data units sent by nodes $S_i$ and $T_j$, respectively |
| P | bidirectional path used for protection |
| S, T | unidirectional paths of P started by $S_i$ and $T_j$, respectively |

A. Operational Assumptions

In this section we introduce a number of operational assumptions.

The protection is at the connection level, and it is assumed that all connections that are protected together will have the same transport capacity, e.g., DS-3.

All connections are bidirectional.

A set of connections will be protected together by a protection path. The protection path is bidirectional, and it passes through all end nodes of the protected connections. Links of the protection path have the same transport capacity of the protected connections.

The protection path is terminated, processed, and retransmitted at each node on the path.

Data units are fixed and equal in size.

Protection will be guaranteed against any single link failure on working paths.

When a link carrying active (working) circuits fails, the tail node of the link will receive empty data units, e.g., a data unit containing all zeroes.

The symbols used in this section are listed in Table III. More symbols will be introduced later, and as needed.

It should be pointed out that all addition operations (+) in this paper are over the GF(2) field. That is, addition is modulo two, i.e., XOR operations.

B. The Strategy

We assume that there are N bidirectional unicast connections, where connection i is between nodes $S_i$ and $T_j$. Nodes $S_i$ and $T_j$ belong to the two sequences $\mathcal{S}$ and $\mathcal{T}$, respectively, as will be defined below. Data units are transmitted by nodes as will be defined below. Data units are transmitted by nodes in $\mathcal{S}$ and $\mathcal{T}$ in rounds, such that data units transmitted from $S_i$ to $T_j$ in round n are denoted by $d_i(n)$ units, and data unit transmitted from $T_j$ to $S_i$ in the same round are denoted by $u_j(n)$ units. The data units received by nodes $S_i$ and $T_j$ are denoted by $\hat{u}_j$ and $\hat{d}_i$, respectively, and can be zero in the case of failure.

Considering the connection between nodes $S_i$ and $T_j$, then under normal conditions, the working circuit will be used to deliver $d_i$ and $u_i$ data units from $S_i$ to $T_j$ and from $T_j$ to $S_i$, respectively. The basic idea for receiving a secondary copy of data $u_j(n)$ by node $S_i$, for example, is to receive on two opposite directions the signals given by the following two equations, where all data units belong to the same round, n:

$$\sum_{k,S_k \in A} d_k + \sum_{k,T_k \in B} \hat{u}_k \quad (3)$$

$$u_j + \sum_{k,T_k \in B} u_k + \sum_{k,S_k \in A} \hat{d}_k \quad (4)$$

where A and B are subsets of nodes in the sequence of nodes S and T, respectively, and a node in A communicates with a node in B, and vice versa. As stated above, the sum is modulo 2. In this case, $S_i$ can recover $u_j$ by adding equations (3) and (4) using modulo 2 addition also.

Our procedure goes through the following steps:

A.1 Protection Path Construction and Node Enumeration:

1) Find a bidirectional path, P, that goes through all the end nodes of the connections in $\mathcal{N}$. P consists of two unidirectional paths in opposite directions. These two unidirectional paths do not have to traverse the same links, but must traverse the nodes in the same order. One of these paths will be referred to as S and the other one as T.

2) Given the set of nodes in all $\mathcal{N}$ connections which will be protected together, construct two sequences of nodes, $\mathcal{S}=(S_1, S_2, \ldots, S_N)$ and $\mathcal{T}=(T_1, T_2, \ldots, T_N)$ of equal lengths, $\mathcal{N}$. If two nodes communicate, then they must be in different sequences. The sequence of nodes in $\mathcal{S}$ is arbitrarily enumerated in one direction, and the sequence of nodes in $\mathcal{T}$ is enumerated in the opposite direction on the path. The nodes are enumerated such that one of the two end nodes P is labeled $S_1$. Proceeding on P and inspecting the rest of the nodes, if a node has not been accounted for, it will be the next node in $\mathcal{S}$, and using ascending indices for $S_i$. Otherwise, it will be in $\mathcal{T}$, and using descending indices for $T_i$. Therefore, node $T_I$ will always be the other end node on P. The example in FIG. 11 shows how ten nodes, in five connections are assigned to $\mathcal{S}$ and $\mathcal{T}$. The bidirectional protection path is shown as a dashed line.

3) A node $S_i$ in $\mathcal{S}$ ($T_j$ in $\mathcal{T}$) transmits $d_i$ ($u_j$) data units to a node in $\mathcal{T}$ ($\mathcal{S}$), and is received as $\hat{d}_i$ ($\hat{u}_j$).

4) Transmission on the two unidirectional paths S and T are in rounds, and are started by nodes $S_1$ and $T_1$, respective. In round n, all data units transmitted on S and T must belong to that round.

A.2 Encoding operations:

The network encoding operation is executed by the nodes in $\mathcal{S}$ and $\mathcal{T}$. Assume that nodes $S_i$ and $T_j$ are in the same connection. Therefore, the encoding operations works as follows (assuming no link failures), where all data units are assumed to belong to the same round, n:

1) Node $S_i$:

a) The node will add the following data units to the signal received on S:

Data unit $d_i$, which is generated by $S_i$.

Data unit $\hat{u}_j$ which is received on the primary path from $T_j$. The result is transmitted on the ongoing link in S. These data units will be removed by node $T_j$ when it processes the signal on S, as will be explained below.

b) The node will add the same data units to the signal received on T, and will transmit the result on the outgoing link in T. These operations will remove $\hat{d}_i$ and $u_j$ which were added to S by $T_j$, as will be explained next.

2) Node $T_j$:

a) The node will add the following data units to the signal received on S:

Data unit $u_j$, which is generated by $T_j$.

Data unit $\hat{d}_i$, which is received on the primary path from $S_i$. The result is transmitted on the outgoing link in S. Also, these operations will remove $\hat{u}_j$ and $d_i$ which were added to S by $S_i$, as illustrated above.

b) The node will add the same data units to the signal received on T, and will transmit the result on the outgoing link in T. These data units will be removed by the operations performed by $S_i$ on T.

An example of this procedure in shown in FIG. 12, in which three connections perform this operation.

To understand the sums of data units generated by the procedure, we define the following:

$T(S_i)$: node in $\mathcal{T}$ transmitting and receiving from $S_i$.

$S(T_j)$: node in $\mathcal{S}$ transmitting and receiving from $T_j$.

$\tau(S_i)$: node in $\mathcal{T}$ next to $S_i$ on S.

$\sigma(T_j)$: node in $\mathcal{S}$ next to $T_i$ on T.

$D_i$=sum of d data units, generated by, and transmitted by $S_1, S_2, \ldots, S_i$ on unidirectional path S which have not yet been removed by nodes $T(S_1), T(S_2), \ldots, T(S_i)$.

$U_i$=sum of u data units transmitted by $T_1, T_2, \ldots, T_i$ on unidirectional path T which have not yet been removed by nodes $S(T_1), S(T_2), \ldots, S(T_i)$.

$\hat{U}_i$=sum of data units received by $S_1, S_2, \ldots, S_i$ and transmitted on unidirectional path S which have not yet been removed by nodes $T(S_1), T(S_2), \ldots, T(S_i)$.

$\hat{D}_i$=sum of d data units received by $T_1, T_2, \ldots, T_i$ and transmitted on unidirectional T which have not yet removed by nodes $S(T_1), S(T_2), \ldots, S(T_i)$.

Based on the above, node $S_i$ will receive the following on S:

$$D_{i-1}+\hat{U}_{i-1} \quad (5)$$

and the following on T:

$$U_{\tau(S_i)}+\hat{D}_{\tau(S_i)} \quad (6)$$

Similarly, node $T_j$ will receive the following on S and T, respectively:

$$D_{\sigma(T_j)}+\hat{U}_{\sigma(T_j)} \quad (7)$$

$$U_{j-1}+\hat{D}_{j-1} \quad (8)$$

A.3 Recovery from Failures

Suppose that a link on the path between nodes $S_i$ and $T_j$ fails. In this case, $S_i$ does not receive $u_j$ on the primary path, and it receives $\hat{u}_j=0$ instead. However, it can recover $u_j$ by adding equations (5) and (6), in addition to $d_i$. Similarly, $T_j$ can recover $d_i$ by adding equations (7) and (8), in addition to $u_j$. For example, at node $S_2$ in FIG. 12, adding the signal received on S to the signal received on T, then $u_2$ can be recovered, since $T_2=T(S_2)$ generated $u_2$. Also, node $T_2$ adds the signals on S and T to recover $d_2$.

Notice that the reception of a second copy of $u_2$ and $d_2$ at $S_2$ and $T_2$, respectively, when there are no failures, requires the addition of the $d_2$ and the $u_2$ signals generated by the same nodes, respectively.

As a more general example, consider the case in FIG. 11. Node $S_5$, for example, will receive the following signal on S:

$$d_1 + \hat{u}_2 + d_3 + \hat{u}_1 + d_4 + \hat{u}_4 \quad (9)$$

and will receive the following on T:

$$u_1 + \hat{d}_3 + u_2 + \hat{d}_1 + u_3 + \hat{d}_5 + u_4 + \hat{d}_4 \quad (10)$$

If the link between $S_5$ and $T_3$ fails, then $\hat{d}_3=0$, and adding equations (9) and (10) will recover $u_3$ at $S_5$.

X. CONCLUSIONS

The present invention includes a method for achieving 1+N protection against single link failures by using network coding on p-Cycles. Data units are coded at sources and destinations, and transmitted in opposite directions on p-Cycles, such that when a link on the primary path fails, data can be recovered from the p-Cycle using simple modulo 2 addition. The strategy allows fast and graceful recovery from failures. It also simplifies the management and control planes, and can also provide a mechanism for error detection and correction. The scheme can be implemented at a number of layers and using a number of protocols including IP, or GFP in NGS. In order to protect on-cycle links, a hybrid 1+N/1:N strategy was presented in which on-cycle links are protected using 1:N protection. A performance evaluation study showed that as the density of the graph increases the efficiency of the proposed 1+N protection scheme improves in terms of decreasing the ratio of the required protection circuits compared to the working circuits. Moreover, the 1+N protection becomes more efficient than 1+1 protection under the same conditions. Therefore, the proposed strategy can be a candidate for use in networks with high average nodal degrees, such as NJ-LATA and the Pan-Eurpoean COST239 networks.

Thus, a method has been described which provides for an approach similar to the 1+1, except that one backup circuit is shared between N sessions, and data from all N sessions is transmitted on the backup circuit, but in a specially encoded way. The use of the networking coding technique results in a significant saving over the 1+1 method, namely using the same resources required by the 1:N method, but at the speed of the 1+1 method.

The method described provides advantages which include:
Reduced cost of bandwidth resources, since a single backup circuit can protect multiple working circuits.
Fast and speedy recovery from failures, since a receiver would be receiving two copies of the same signal at the same time. It is estimated that the maximum time difference (jitter) between receiving the original signal and the backup signal would be no more than a few milliseconds, which is much less than the industry accepted 50 millisecond limit on restoration time.
No need to involve the management and control planes in the detection of failures, hence simplifying the management and control planes.
Provision of error detection and correction at no added cost.

It should be apparent that the present invention provides for protection of multiple communication sessions using the bandwidth resources on the order of those required to protect a single communication session. This is facilitated through the use of network coding on a protection cycle. Protection cycles, as well as preconfigured cycles (p-Cycles) have been used to provide 1:N protection. That it, it protects N communication sessions but the failed session must be detected, and switching must take place to switch traffic from the failed connection to the backup oath. In the methodology provided herein, there is no need to detect the failure, or switch the failed connection. Transmissions from all connections are coded together and transmitted in two different directions on a cycle, so that the signal can be recovered by the receiver in two ways: on the working path, and on the protection (cycle) path. This is faster, requires only the resources needed to protect a single circuit, and provides error detection and correction as a by-product.

The methodology may be used in communication networks. It may be used by network service providers. It may be implemented in network equipment as well. Thus, the methodology can be implemented in any number of means. The present invention contemplates there may be other uses as well. That which has been disclosed is merely exemplary. The present invention contemplates numerous additional variations, options, and embodiments may fall within the broad spirit and scope of the invention.

REFERENCES

[1] D. Zhou and S. Subramaniam, .Survivability in optical networks,. *IEEE Network*, vol. 14, pp. 16.23, Nov./Dec. 2000.
[2] D. Stamatelakis and W. D. Grover, "Theoretical underpinnings for the efficiency of restorable networks using preconfigured cycles (p-cycles)," *IEEE Trans. on Communications*, vol. 48, no. 8, pp. 1262-1265, 2000.
[3] D. Stamatelakis and W. D. Grover, "Ip layer restoration and network planning based on virtual protection cycles," *IEEE Jour. on Selected Areas in Communications*, vol. 18, no. 10, pp. 1938-1949, 2000.
[4] W. D. Grover, *Mesh-based survivable networks:options and strategies for optical, MPLS, SONET, and ATM Networking*. Upper Saddle River, N.J.: Prentice-Hall, 2004.
[5] R. Ahlswede, N. Cai, S.-Y. R. Li, and R. W. Yeung, "Network information flow," *IEEE Trans. on Information Theory*, vol. 46, pp. 1204-1216, July 2000.
[6] T. Ho, D. R. Karger, M. Medard, and R. Koetter, "Network coding from a network flow perspective, in *Intl. Symp. on Info. Theory*, 2003.
[7] D. S. Lun, M. Medard, T. Ho, and R. Koetter, "Network coding with a cost criterion,. tech. rep., MIT LIDS Technical Report P-2584, 2004.
[8] R. Koetter and M. Medard, "An algebraic approach to network coding," *IEEE/ACM Trans. on Networking*, vol. 11, pp. 782-795, Oct. 2005.
[9] S. Jaggi, P. Sanders, P. A. Chou, M. Effros, S. Egner, K. Jain, and L. M. G. M. Tolhuizen, "Polynomial time algorithms for multicast network code construction," *IEEE Trans. on Information Theory*, vol. 51, pp. 1973-1982, June 2005.
[10] C. Fragouli, J.-Y. LeBoudec, and J. Widmer, "Network coding: An instant primer," *ACM Computer Communication Review*, vol. 36, pp. 63-68, Jan. 2006.
[11] E. Hernandez-Valencia, M. Scholten, and Z. Zhu, "The generic framing procedure (gfp): An overview," *IEEE Communications*, vol. 40, pp. 63-71, May 2002.
[12] G. Shen and W. D. Grover, "Extending the p-cycle concept to path segment protection for span and node failure recovery," *IEEE Jour. on Selected Areas in Communications*, vol. 21, pp. 1306-1319, Oct. 2003.

All references set forth are herein incorporated by reference in their entirety.

What is claimed is:

1. A method for protecting a network having a plurality of nodes interconnected with a plurality of bidirectional connections, the method comprising:
combining data units from a plurality of bidirectional connections using network coding to form a protection signal;
transmitting the protection signal over a protection circuit, concurrent with transmission of the data units on the bidirectional connections, to thereby protect the plurality of bidirectional connections;

wherein each of the bidirectional connections are link disjoint from other of the bidirectional connections; and
wherein the bidirectional connections are link disjoint from the protection circuit.

2. The method of claim 1 wherein the protection circuit is implemented by a p-Cycle.

3. The method of claim 1 wherein the data units from the set consisting of Generic Framing Procedure (GFP) data units, Multi-Protocol Label Switching/Generalized Multi-Protocol Label Switching (MPLS/GMPLS), Internet Protocol over Wavelength Division Multiplexing (IP-over-WDM), and combinations thereof.

4. The method of claim 1 wherein the network is a mesh network.

5. The method of claim 1 wherein the method is implemented in network equipment.

6. The method of claim 1 wherein the network coding provides for using an XOR operation.

7. The method of claim 1 further comprising recovering a signal sent over the network using the protection signal.

8. The method of claim 1 further comprising detecting a failure in a session communicated over one of the bidirectional connections.

9. The method of claim 1 further comprising recovering data units of a failed connection using the protection signal.

10. The method of claim 1 further comprising using the protection signal to assist in recovery from an error detected in one of the bidirectional connections.

11. A system, comprising:
a communications network comprising a plurality of nodes;
a plurality of bidirectional connections interconnecting the nodes;
a protection circuit for protecting the plurality of bidirectional connections;
wherein each of the plurality of bidirectional connections being link disjoint from all other of the plurality of bidirectional connections;
wherein the protection circuit being link disjoint from the plurality of bidirectional connections;
wherein the protection circuit being adapted to convey a protection signal formed by combining data units from the plurality of bidirectional connections using network coding to thereby protect the plurality of bidirectional connections.

12. The system of claim 11 wherein the protection circuit is implemented by a p-Cycle.

13. The system of claim 11 wherein the data units from the set consisting of Generic Framing Procedure (GFP) data units, Multi-Protocol Label Switching/Generalized Multi-Protocol Label Switching (MPLS/GMPLS), Internet Protocol over Wavelength Division Multiplexing (IP-over-WDM), and combinations thereof.

14. The system of claim 11 further comprising an article of network equipment, the article of network equipment adapted to form the protection signal by combining data units from the plurality of bidirectional connections using network coding.

15. The system of claim 11 further comprising means for forming the protection signal by combining data units from the plurality of bidirectional connections using network coding.

16. A system, comprising:
a communications network comprising a plurality of nodes;
a plurality of bidirectional connections interconnecting the plurality of notes;
a protection circuit for protecting the plurality of bidirectional connections;
wherein the protection circuit being implemented by a p-Cycle;
wherein each of the plurality of bidirectional connections being link disjoint from all other of the bidirectional connections;
wherein the protection circuit being link disjoint from the plurality of bidirectional connections;
means for forming a protection signal by combining data units from the plurality of bidirectional connections using network coding to thereby protect the plurality of bidirectional connections.

17. A system, comprising:
a communications network comprising a plurality of nodes;
a plurality of bidirectional connections interconnecting the plurality of nodes;
a protection circuit for protecting the plurality of bidirectional connections;
wherein the protection circuit being implemented by a protection path;
wherein each of the plurality of bidirectional connections being link disjoint from all other of the bidirectional connections;
wherein the protection circuit being link disjoint from the plurality of bidirectional connections;
means for forming a protection signal by combining data units from the plurality of bidirectional connections using network coding to thereby protect the plurality of bidirectional connections.

* * * * *